Oct. 27, 1936.  P. M. BOURDON  2,058,557
TIRE PRESSURE GAUGE
Filed May 31, 1935
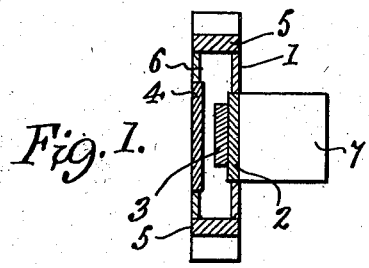
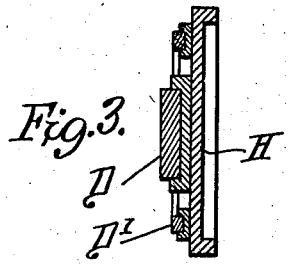
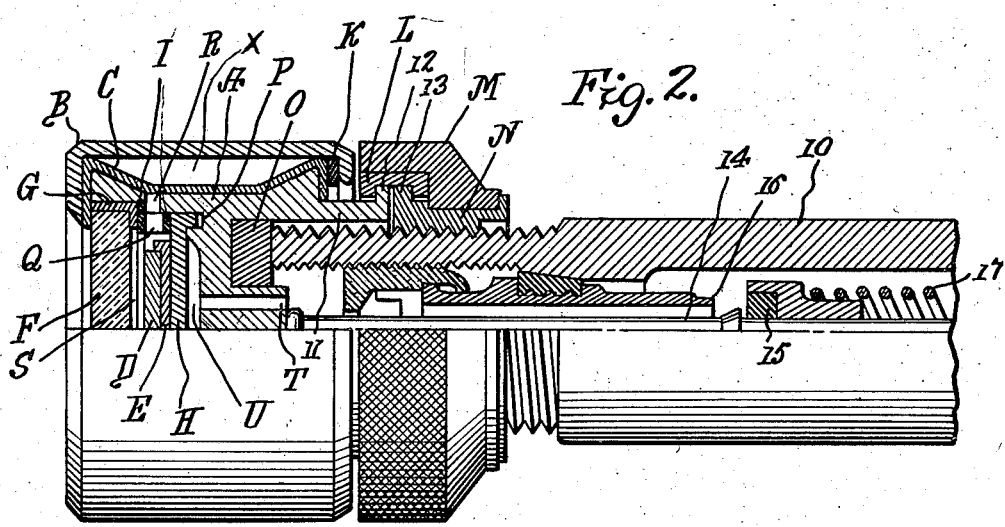
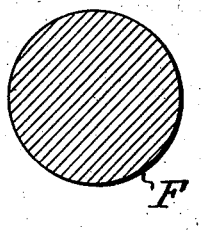
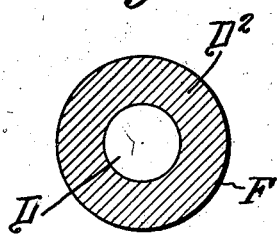
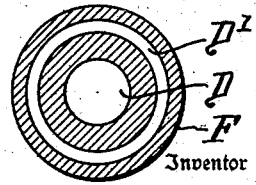
Inventor
Pierre Marcel Bourdon
By Wilkinson & Mawhinney
Attorneys.

Patented Oct. 27, 1936

2,058,557

UNITED STATES PATENT OFFICE 2,058,557

TIRE PRESSURE GAUGE

Pierre Marcel Bourdon, Paris, France, assignor to Michelin et Cie., Clermont-Ferrand, France, a corporation of France Application May 31, 1935, Serial No. 24,405
In France August 13, 1934

8 Claims. (Cl. 116—34)

The present invention relates to improvements in tire pressure gauges, and has for an object to produce a gauge more especially adapted for the more recent low pressure automobile tires.

In this type of tire it is essential that the pressure not drop below a certain predetermined minimum. Also the admissible range of pressure variation in tires of this character is necessarily very slight, requiring a sensitive and precise indicator.

It is an object of the invention to provide an improved gauge to meet these requirements.

The invention also aims to provide an improved gauge which will afford a clear reading, and at a distance from the gauge.

A further object of the invention is to provide a luminous device for ready reading at night.

A still further object of the invention is to provide an improved gauge embodying a dark fluid for improved visibility in reading during the day time.

A still further object of the invention is to produce a device which will also serve the purpose of a graduated manometer.

With the foregoing and other objects in view, the invention will be more fully described hereinafter, and will be more particularly pointed out in the claims appended hereto.

In the drawing, wherein like symbols refer to like or corresponding parts throughout the several views.

Figure 1 is a schematic representation of a device illustrating the principle on which a gauge constructed in accordance with the present invention operates.

Figure 2 is a side view, with parts broken away and parts shown in section, of an improved gauge constructed according to the present invention.

Figure 3 is a section taken through the mirror and its carrier showing a modification.

Figure 4 is a plan view showing the face of the gauge when inoperative.

Figure 5 is a similar view showing the reading on the gauge of normal pressure, and Figure 6 shows a reading of the gauge according to the modification of Figure 3 in which the pressure exceeds normal.

Referring more particularly to the drawing and for the present to the diagram shown in Figure 1, 1 designates a cylindrical chamber. This chamber has front and rear walls. Into the front wall is let a glass window 4. Into the rear wall there is let an elastic membrane 2 which forms the carrier for a mirror 3. The chamber 1 contains an annular elastic sleeve 5 which extends about the fluid space 6 in which is contained a colored fluid. Normally this colored fluid occupies the space between the window 4 and the mirror 3, the mirror 3 being normally drawn back away from the window 4 by the inherent resiliency within the resilient membrane 5, so that the intermediate body of colored fluid lying between the window and mirror obscures the mirror 3 and prevents its being seen through the glass 4. In other words the normal condition of the gauge is substantially as shown in Figure 4 where the disc represents the front face of the window 4 with the subjacent colored fluid backing the same. The elastic collar 5 of rubber or other suitable material has a certain selected inherent resiliency which will oppose the expansion of the colored fluid 6 as hereinafter explained.

7 represents a container for air under pressure, the pressure of which air is to be registered by the gauge; or 7 may indicate a tube carried by the gauge, or separate from it, leading to a chamber or reservoir, such as the interior air space of a pneumatic vehicle tire.

When the pressure of the fluid in 7 attains a predetermined value the membrane 2 applies the mirror 3 against the glass 4. The mirror is preferably of smaller diameter than the window 4 and the condition brought about is that illustrated in Figure 5 where the mirror presents a clear or white, or shiny disc against the glass pane 4, which mirror disc is surrounded by the colored fluid 6. This colored fluid showing through the glass window 4 about the mirror disc 3 forms a contrast such as is brought out in Figure 5. When the elastic membrane 2 and the mirror 3 are applied against the window 4 the colored fluid 6 is expanded outward in all radial directions against the elastic collar 5, causing this collar to be distorted or expanded in a radial direction, and thus putting the collar 5 under a potential condition in readiness to react to force the colored fluid back between the window 4 and the mirror 3 and to force the mirror and its diaphragm away from the window 4.

The elastic membrane 2 has also been put under potential tension when applying its mirror 3 against the window 4. Consequently the elastic tension of the collar 5 opposes the air pressure coming in at 7, which is the pressure to be registered.

These gauges are designed to be screwed onto the valve stems of the tires and to be left permanently in place. Consequently when the pressure in 7 falls below the selected strength of tension of the collar 5 the inherent elasticity in this member will tend to restore it to its initial position, thus requiring that the mirror 3 be withdrawn from the rear face of the window 4, and by regaining its initial shape and position, the elastic collar 5 will force the colored liquid 6 again between mirror 3 and its window 4, thus blotting out from view the mirror disc and indicating a fall from the normal pressure and the necessity for inflating the tire.

Referring more particularly to Figure 2, which shows a commercial form of the device, this device is screwed onto the valve stem which is indicated at 10.

The device includes a body or core A contained within a casing B, in which is also included an elastic collar C. The mirror D is carried by a backing plate E affixed to the elastic membrane H, which membrane has its ends appropriately fixed in a part of the core or body A. The transparent window is shown at F and this forms the outside cover of the device with the exception of a rim about this glass cover, which rim is formed by a portion of the casing B. The body A is provided on its periphery with openings or ports R. These ports open against the elastic collar C on their outer ends and upon the fluid space S at their inner ends. The body or core A also has an axially extending passage or port T communicating with the valve stem 10 at one end and with an interior space U back of the elastic membrane H. The rubber collar C covers the body A and the inturned ends of the collar C may be clamped against the body by the overturned flanges of the casing B, there preferably being a washer or gasket K interposed between the casing and the rubber collar C at one end. The membrane H which carries the mirror D and its backing plate E has its peripheral edge rearwardly turned and inserted into an annular groove P formed in the body or core A.

Against the edge of the membrane H is applied a ring I in order to retain the front edge within the groove P. In this retaining ring I there are formed radial openings Q in registry with the ports R in the body A. The ring I at its forward edge fits against a flange binding member which surrounds the peripheral edge of the glass window F. The window F is held between the rear flange of this metal binding strip G and the forward downturned edge of the elastic collar C which is bound in place by the flanged forward edge of the casing B.

The colored fluid is introduced into the chamber S and normally occupies the space between the window F and the mirror D, which mirror is normally positioned when the membrane H is in its resting position Figure 2 in which it leaves a gap between its forward edge and the rear edge of the window F. The body A is provided with an annular recess at its rear portion occupied by an annular block O of rubber or some other resilient material designed to engage the end of the valve stem 10 when the device is secured in place thereon. The body A also carries an extension piece 11 having an outturned flange 12. This extension piece 11 overlaps the threaded portion of the valve stem 10 for a distance.

A nut N carried by the device is threaded to mate with the external threads upon the valve stem 10 and this nut is also provided with an outwardly extending flange 13 disposed in proximity to the flange 12. The two flanges 12 and 13 are held together and against axial spreading or displacement by a split collar L which has end portions fitting down below the radial heights of the two flanges 12 and 13. The split collar L is held in place and against radial expansion away from the flanges 12 and 13 by reason of its occupancy of a recess in the nut operating ring M which ring is affixed to the nut N. The ring M may have a milled external peripheral surface for ease in rotating the same. The rotation of the operating ring M requires rotation with it of its entrained nut N. Consequently by rotating the operating ring M in one or the other direction, the device may be run onto or off of the valve stem 10.

The central portion of the core or body A inwardly of the opening or passage T is designed to engage the pin 14 which is a part of the valve insides and which is used to move the valve 15 off its seat 16. The spring 17 normally keeps the valve 15 up to the seat 16, thus preventing escape of pressure from the tire.

It is well understood that in inflating, the pin 14 is thrust inwardly by the nozzle of the inflating hose to force the valve 15 backwardly and thus open the port for the free admission of the air or other fluid into the interior of the tire. It is of course necessary that in a gauge the interior air space of the tire be put in free communication with the active parts of the gauge and the core or body serves this function when the device is screwed home onto the valve stem as shown in Figure 2.

In the use of the device, when the pressure of the tire is normal air from the chamber passes through the valve 15 which is always open, then passes through the passage T and gains entrance into the chamber U between the body A and the membrane H. Under the force of this pressure the mirror D is applied against the window F and appears clearly. In so doing the colored liquid has been crowded through the openings Q and R against the collar C and into the space between the body A and the collar C. The outer peripheral surface of the body A is preferably provided with helicoidal or spiral grooves, which are similar to oil grooves in the main bearings of internal combustion engines and in other bearings.

These helicoidal grooves, like the oil grooves, facilitate the flow and distribution of the liquid over the entire peripheral surface of the body A and against all parts of the collar C. If the pressure of the air drops below the predetermined value the collar C exerts pressure on the liquid and returns it through the openings Q and R into the chamber S. The membrane H retracts then and carries with it the mirror D which no longer appears against the window F; and one sees only the colored liquid which is rendered more visible by the reflection of the mirror.

After such fall in pressure from the predetermined normal, at which time the mirror is withdrawn from the window as just explained, further falls in pressure will of course not be recorded on the device. The tire is then inflated until the desired air pressure is attained and the membrane H displaced by the pressure of the air causes the mirror to reappear in the visible opening of the gauge. This device will show when the pressure falls below normal but it will not show when the pressure exceeds the normal predetermined pressure. But it will be interesting in some cases to know when the value of the pressure exceeds the normal.

To accomplish this it suffices as shown in Figure 3, which is an axial section of the membrane H, to provide the membrane H with not only a single mirror D but with a second annular mirror D′, the outer face of which is disposed in a plane offset backwardly from the plane of the outer face of the central mirror D. The mirror D being at the central portion of the elastic membrane H and having its face set in advance will become applied to the window before the annular mirror D′ will become so applied. In other words it will take less pressure, namely the normal desired pressure within the tire to overcome the tension of the intermediate part of membrane H sufficiently to force the central mirror D against the window, but it will take a greater air pressure to expand the outer portions of the membrane H which are near the anchored ends thereof to effect an application of the annular mirror D′ against the window F. Thus when the value of the air pressure is too great the membrane H places against the window F not only the mirror D but also the mirror D′. One will see then both the mirrors D and D′. There are three possible positions of the mirrors and the colored liquid which are represented in Figures 4, 5 and 6.

In Figure 4 the pressure of the fluid is too low, only the colored liquid showing. In Figure 5 the air pressure is normal, and the central mirror D appears in the window surrounded by a ring of colored liquid $D^2$. In Figure 6 the air pressure is too high, and there shows up brightly in the center of the window the central mirror D and in a concentric ring the mirror D′.

By connecting a calibrated member to the collar C such member would move with the member C in response to the variations in pressure within the tire and consequently this calibrated member moving past an index point would show the precise pressure within the tire. In this way the device is useful as a manometer and it is a very accurate and sensitive one because of the lightness of the parts.

It will be noted also that the device dispenses with the use of springs and is therefore more sensitive and reliable and will possess a longer life. It will be noted from Figure 2 that in the form of the device illustrated the peripheral portion of the core or body A is recessed to receive the collar C and that outwardly of this collar is a space B between the collar and the casing A. This space X affords sufficient room for the collar C to expand outwardly. It also forms a chamber in which a confined volume of air or other gas may be made to oppose the outward movement of the collar C such as would permit of the separation of the colored fluid out of the path of the mirror D′.

Hence this confined volume of gas in the space X may be selected as to density to give the proper strength to the gauge necessitating the overcoming of the elasticity in the membrane H and in the collar C and the overcoming of the pressure of the gas X before the mirror D may be applied to the window F.

For night use instead of a mirror the devices D and D′ may be covered over with some luminous material, such for instance as that used upon the dials of watches. For example the coating may have a base of sulfide of zinc and a salt of thorium. The colored liquid is preferably red or some deep color sufficient to prevent penetration of the light from the faces of the luminous mirror members when the same are drawn back from the window. Thus when the mirrors are thrust against the window they will show in contrast to the red liquid a luminous spot and ring such as can be clearly discernible in the dark. Of course this could also be used in the day time as the contrast between the liquid and the luminous faces of the mirrors is easily observable in day light.

It is obvious that various changes and modifications may be made in the details of construction and design of the above specifically described embodiment of this invention without departing from the spirit thereof, such changes and modifications being restricted only by the scope of the following claims.

What is claimed is:—

1. An improved air pressure gauge comprising a casing, a colored fluid therein, an expansible collar in the casing surrounding the body of fluid, a window in the casing, an indicating member behind and normally separated from said window with the colored fluid therebetween, and movable means for carrying said indicating member and adapted to be moved in response to the pressure to be indicated to permit the displacement of the colored fluid and the movement of the indicating member against said window.

2. An improved air pressure gauge comprising a chamber, a colored fluid in the chamber, an elastic collar surrounding the fluid, a window in the chamber, an elastic membrane communicating with the fluid in the chamber and with the pressure to be indicated and acting to move into the chamber when the pressure exceeds the tension strength of the membrane whereby to cause compression of the fluid against the collar and the elastic expansion of the collar, and an indicating member carried by said membrane and adapted to be moved thereby against the inner face of the window.

3. An improved air pressure gauge comprising a chamber, an opaque liquid contained therein, a window in the chamber, a central indicating member, an annular indicating member, and means responsive to the pressure to be indicated for normally holding said indicating members away from said window and for presenting first one indicating member to the window while withholding the other indicating member, and presenting the latter indicating member only on a predetermined increase in pressure.

4. An improved air pressure gauge comprising a casing, an opaque fluid in the casing, a window in the casing, a flexible membrane secured at its edge portions in the casing and being exposed on the exterior to the influence of the pressure to be indicated, two indicating members carried by said membrane and adapted to be applied on expansion of the membrane against said window, the outer face of one of said indicating members being offset backwardly with respect to the window from the outer face of the other indicating member whereby the members will be applied first the one and then the other under response to different pressures.

5. A tire pressure gauge comprising a casing, means connected to the casing to secure the gauge to a valve stem, a core in the casing adapted to engage the pin of the inner valve of the tire and open the valve, a window in the casing, a flexible membrane held by the core in position to receive against its inner side the pressure from the tire, and a mirror carried by the outer side of the membrane normally spaced back of the window but movable against the window when the membrane is expanded sufficiently by the air pressure within the tire.

6. A tire pressure gauge comprising a casing, means connected to the casing whereby the casing may be mounted on the valve stem of a pneumatic tire, a window in the front of the casing, a chamber in the casing back of the window, a colored liquid in said chamber, an elastic collar surrounding the liquid in the chamber, an elastic membrane normally spaced from the window, a mirror carried by the membrane for movement out against the window, a core in the casing holding the membrane and having a cavity back of the membrane in communication with the air space of the tire, and sealing means between the valve stem and core to avoid the escape of air.

7. A tire pressure gauge comprising a core having a chamber therein and a peripheral groove with a wall between the chamber and groove, said wall being perforated, a casing about the core, an elastic collar having its ends caught between the casing and core, the joint so produced forming an air-tight seal for the groove, a window in the front part of the casing, a colored liquid in the chamber, an elastic membrane having its ends secured in the core, a mirror carried on the front side of the membrane, and means to hold the gauge on a tire valve stem.

8. A tire pressure gauge comprising a casing open at both ends, means including a window closing one end of the casing, means including an elastic indicating device closing the opposite end of said casing, the space between said window and indicating device forming a chamber in said casing, a body of fluid in said chamber, said casing having a radial port therethrough into said chamber, and an elastic membrane over the outside of said casing and communicating with said chamber and fluid through said port, said membrane forming an extensible overflow space for fluid displaced by movement of said elastic indicating device towards said window.

PIERRE MARCEL BOURDON.